April 24, 1951 L. HILLMAN 2,549,812
WIND VELOCITY MEASURING MEANS
Filed May 13, 1944 2 Sheets-Sheet 1

INVENTOR.
LEON HILLMAN
BY William D. Hall.
ATTORNEY

INVENTOR.
LEON HILLMAN

Patented Apr. 24, 1951

2,549,812

UNITED STATES PATENT OFFICE 2,549,812

WIND VELOCITY MEASURING MEANS

Leon Hillman, New York, N. Y.

Application May 13, 1944, Serial No. 535,564

9 Claims. (Cl. 73—204)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to measuring systems incorporating hot-wire anemometers and more particularly to the use of hot-wire anemometers in conjunction with radiosonde equipment.

Anemometers for the velocity measurement of moving air currents may be classified according to whether they make use of pressure, the kinetic energy, or the cooling power of the wind. The present invention is concerned with those instruments of the last named category designated as hot-wire anemometers wherein a heated electrical resistance having a high temperature coefficient, is cooled by an air stream and the resultant change in resistive value, by means of suitable measuring circuits, provides an index to the velocity of said air stream.

Inasmuch as circumambient temperature as well as moving air currents will influence the response of hot-wire anemometers, meters heretofore in use have minimized the former factor by electrically heating the wire to a high temperature, in the order of 1000° centigrade, thereby making the anemometers reasonably independent of the air temperature and almost exclusively responsive to the cooling effect of air currents. For this purpose these hot-wire anemometers incorporate a power unit furnishing the requisite heating current.

Where it is desired to employ a hot-wire anemometer in radiosondes, automatic weather stations, or for similar meteorological applications entailing telemetric means for transmitting the meter indications to remote points, the use of hot-wire anemometers of the type previously known is not always feasible. For example, in order to incorporate an anemometer of this character in a radiosonde equipped balloon for measuring the velocity of the upper winds, it would be exigent to include a cumbersome battery supply furnishing sufficient power for the heating current. Since weight is at a premium in such devices, the use of conventional hot-wire anemometers in this application is manifestly impractical.

Accordingly, it is an object of this invention to provide a hot-wire anemometer circuit having a high percentage of accuracy, which may be operated at a considerably lower temperature relative to meters heretofore in use, thereby reducing the power requirements of the heater to a point permitting its use with radiosonde apparatus.

A further object of this invention is to provide a hot-wire anemometer wherein the heater is an element distinct from the thermal responsive resistor.

It is another object of this invention to provide an anemometer telemetric circuit which is adapted to correctly transmit the anemometer readings to remotely disposed stations.

It is an additional object of this invention to provide an anemometer radiosonde circuit wherein the accuracy of the anemometer readings are not impaired by variations in the radiosonde transmitter frequency settings as a result of temperature, mechanical factors or other conditions affecting said frequency.

In attaining the objects of this invention, I provide an anemometer comprising a thermal responsive resistance element disposed within an electrical heater coil and electrically insulated therefrom. The heater coil of a type having relatively low power requirements, raises the temperature of the anemometer resistance to a moderately high degree.

The anemometer resistor is incorporated in a radiosonde oscillator circuit in a manner whereby a change in its resistance effects a corresponding shift in the modulation frequency of the oscillator. Also provided is a zero temperature coefficient resistor which may be selectively substituted for the anemometer resistor in the radiosonde circuit. Means are provided for sequentially switching the zero temperature coefficient resistor into the circuit, then switching the anemometer resistor in an unheated condition into the circuit, and finally switching the current on the heater coil.

At a remote station, means are provided for receiving the radiosonde signal and recording the audio modulation component thereof.

In practice, the modulation frequency is first recorded with the zero temperature coefficient resistor in the radiosonde circuit; this first recorded modulation frequency providing the reference or zero level of the anemometer reading. Thereupon, the unheated anemometer resistor is inserted in the radiosonde circuit in place of the reference resistor and the resultant reading indicates the modulation frequency as a function of the ambient temperature. Finally, the heater is switched on and the resultant reading indicates the frequency as a function of the cooling effect of the air stream. The difference between the third and second readings, that is, the modulation frequency obtained with the anemometer resistor in an unheated and in a heated condition, furnishes the index to the velocity of the air stream exclusive of the ambient temperature.

Thus, it may be seen that by this method it is not necessary to raise the temperature of an anemometer resistor to an exceedingly high level in order to obviate the effect of ambient temperature since this factor is eliminated from the anemometer reading without such an expedient. Moreover, since the reference level is set for each reading by the zero coefficient resistor, the frequency stability of the radiosonde equipment is unimportant, the readings being taken on a relative basis in respect to any reference frequency.

For a better understanding of my invention, together with other and further objects thereof, reference is had to the ensuing description taken in connection with the accompanying drawings. The scope of the invention will be pointed out in the accompanying claims.

Figure 1:
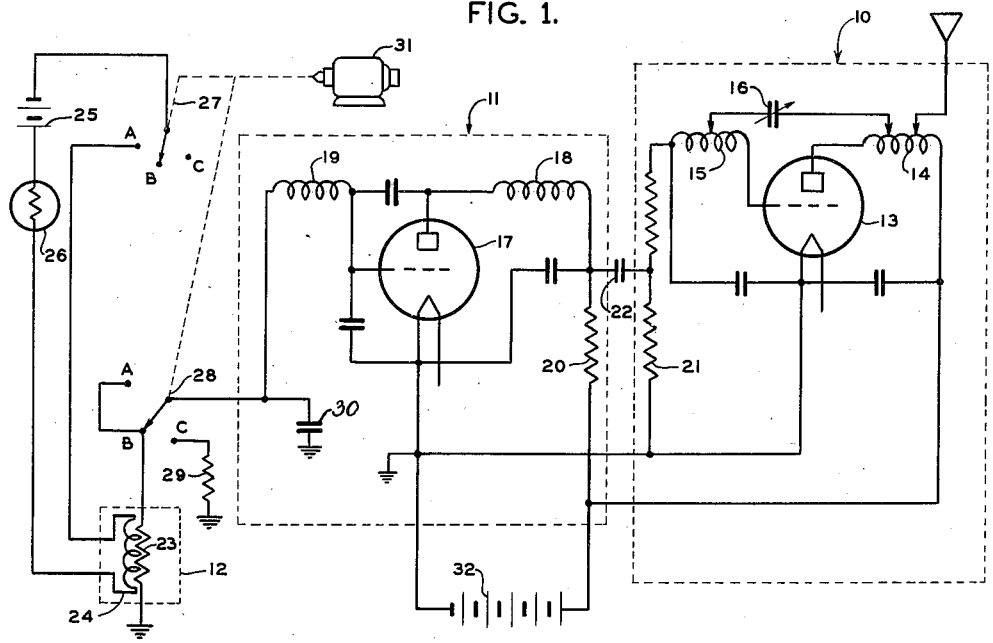
Figure 1 is a schematic circuit diagram illustrating a preferred embodiment of my invention as employed in conjunction with a radiosonde transmitter.

Referring now to the drawing, and more particularly to Figure 1, a meteorological radiosonde transmitter is shown associated with a hot-wire anemometer; the main elements of which comprise a radio frequency oscillator 10, an audio frequency modulator 11, and a hot-wire anemometer 12.

The radio frequency oscillator 10 is of conventional design, including a triode vacuum tube 13, a plate circuit coil 14, a grid circuit coil 15, and a tuning condenser 16. The regenerative coupling between the grid coil 15 and plate coil 14 serves to sustain oscillation in a well known manner.

The modulator 11 is in the form of a relaxation oscillator circuit including a triode vacuum tube 17, a plate coil 18, tightly coupled to a grid coil 19. The pulse output of the relaxation oscillator 11 grid modulates or keys at an audio rate, the radio frequency oscillator 10 by means of voltage pulses flowing through plate resistor 20 which are imposed upon grid bias resistor 21 through coupling capacitor 22. Plate voltage for the oscillator 10 and modulator 11 is obtained from "B" battery 32.

The anemometer 12 comprises a resistor 23 formed of a composition having a high temperature coefficient and a heater coil 24 made of resistance wire having a zero temperature coefficient. The heater coil 24 is directly wound around resistor 23 but is electrically insulated therefrom. The anemometer 12 is mounted in an exposed position so that a moving air stream is permitted to course freely over the surface of resistor 23 and heater 24.

Power for the heater 24 is furnished by battery 25 connected at one terminal through a current regulating ballast tube 26 and at the other terminal through a tri-contact rotary arm switch 27. When switch 27 is positioned on contact A, the current from battery 25 is applied to heater coil 24 thereby raising the temperature of resistor 23 to a desired level.

A second tri-contact rotary arm switch 28 is provided, the arm thereof being mechanically ganged to that of switch 27. Connected between contact C of switch 28 and ground is a resistor 29 constructed of a composition such as manganin having a zero temperature coefficient. When the arm of switch 28 is on position C resistor 29 is connected across condenser 30 of modulator 11. When the arm of switch 28 is set on either contact A or B, the anemometer resistor 23 is connected across condenser 30. The RC combination of condenser 30 and resistor 29 or resistor 23 determines the audio modulation rate of modulator 11.

A motor 31 mechanically coupled to the gang shaft of switches 27 and 28 continuously performs the necessary switching operation. The motor may be electrically actuated, or when used in a radiosonde balloon it may be in the form of a simple wind-driven propeller mechanism. Switches 27 and 28 are designed so that they dwell on contact A for a relatively long period as compared to contacts B and C.

Figure 3:
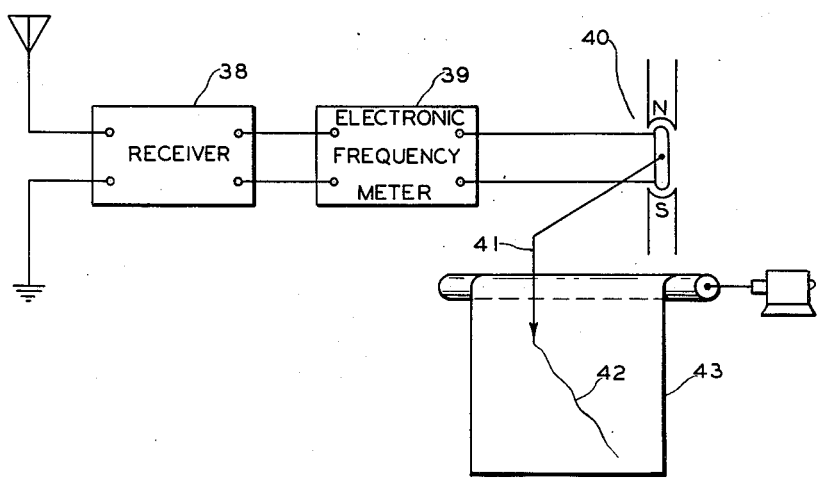
Figure 3 shows the receiving and recording apparatus used at the ground station.

Any suitable radiosonde receiving and recording apparatus may be used in conjunction with my invention to secure a record of the audio modulation frequencies derived from the transmitter signals intercepted at a remote measuring station. One of such systems, shown in Figure 3, suitable for this purpose is that developed by Diamond, Hinman, Dunsmore, and Lapham and described in the Bureau of Standards, Journal of Research, volume 20, pages 369–392. In this system the audio modulation component yielded by the radiosonde receiver 38 is fed to an electronic frequency meter 39 furnishing a direct current output proportional to the frequency of the audio input, but independent of its voltage or wave form. In order to make a record, the direct current output of a frequency meter 40 is then applied to a high speed recording meter wherein by means of a vibrating stylus 41, a continuous line 42 is obtained on a roll chart 43 giving almost instantaneous values of the audio frequency.

The operation of the entire system will now be described. Driven by motor 31, switches 27 and 28 are first set on position C, thus the modulation frequency is governed by the zero coefficient resistor 29; accordingly at the receiving station the recording stylus is set and functions at the reference level. When switches 27 and 28 shift to position B, the anemometer resistor 23 is switched into the radiosonde circuit while heater 24 remains disconnected. The frequency recorded at the receiving station, therefore, is a function of the resistor value 23 as determined by the ambient temperature. Finally, when switches 27 and 28 are positioned on contact A the resistor 23 is again inserted in the radiosonde circuit while battery 25 is electrically connected to the heater coil 24, thereby heating resistor 23. The actual temperature of resistor 23 is determined by the velocity of the air stream passing over its body and this in turn controls its resistance value. The recorded frequency therefore becomes a function of the wind velocity. The ohmic value of resistor 29 as compared to resistor 23 is such that the recorded reference frequency is clearly distinguishable from the recorded ambient temperature and wind velocity frequencies.

Figure 2:
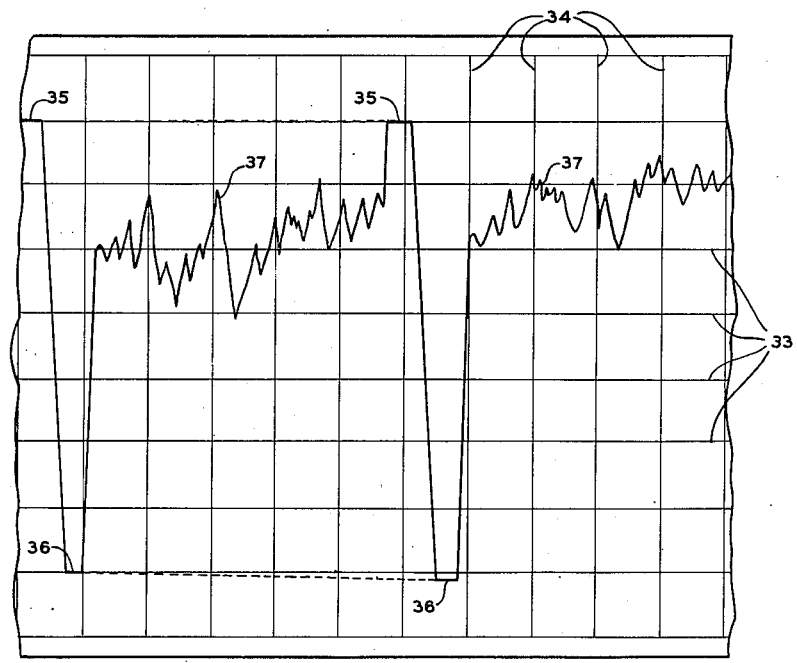
Figure 2 is a sample section of the recording tape showing typical anemometer radiosonde readings.

Referring now to Figure 2 of the drawing, a section of tape is seen after recording. The tape is ruled with evenly spaced horizontal and vertical lines, the horizontal lines 33 representing divisions of frequency and the vertical lines 34 representing divisions of time.

The reference frequency markings 35 are preferably positioned near one edge of the tape to allow space for the other two readings. The ambient temperature markings 36 fall in this instance near the other edge of the tape below the reference markings, and it will be observed that the frequency in respect to time is fairly stable. The wind velocity markings 37, which in this case lie between the reference and ambient temperature markings, however, show a large degree of fluctuation.

In obtaining a reading for a particular instant of time, the reference markings 35 are joined together forming a continuous line (shown as dash lines), and the same procedure is followed with respect to the ambient temperature markings 36. Instantaneous wind velocity frequency readings are taken along a vertical time line 34 between the ambient temperature point and the wind velocity point. By drawing a mean line through the velocity line 37, average values may be ascertained.

By means of a chart whereon the modulation frequency is plotted against wind velocity the recording tape may be readily interpreted. Readings may be further facilitated by employing a transparent chart and superposing said chart over the recording tape. The calibration of the chart is in terms of the mathematical relationship existing between the cooling effect of wind velocity upon the anemometer resistance and the effect of the change in said resistance upon the radiosonde modulation frequency.

It is to be noted that although the anemometer resistor 23 is sensitive to air density as well as temperature, it has been calculated that within a wide range of density variations the effect of density on anemometer resistance is so slight that for all practical purposes it may be disregarded. Where extreme accuracy is desired, the effect of density on the anemometer reading may be determined and compensated for.

In employing the radiosonde anemometer in the field, it is attached to a captive balloon which is launched in the atmosphere to a desired height. Readings may then be taken at any point within the effective operating range of the radiosonde transmitter. The invention may be applied with equal effectiveness to the measurement of gustiness, air velocity in ducts or tunnels, in remote automatic weather stations, and in numerous other meteorological applications.

While there has been described what is at present considered a preferred embodiment of my invention, it will be obvious to those skilled in the art that various changes and modifications may be made therein without departing from the invention and it is, therefore, aimed in the appended claims to cover all such changes and modifications as follow within the true spirit and scope of the invention.

I claim:

1. The combination in an anemometer device comprising a wave generator, a hot-wire anemometer including a thermal responsive resistor exposed to air currents and heating means for same, means for energizing said heating means to heat said resistor intermittently, and means for alternately connecting said anemometer resistor to said wave generator in an unheated condition and in a heated condition in a manner whereby the value of said resistor controls the frequency of said generator.

2. A fluid current measuring device comprising a resistor, the resistance of which varies with temperature, said resistor being exposed to said fluid current, periodic means to alternately apply and remove heating energy to said resistor, the intervals of application and removal of said heating energy being long enough to alternately heat said resistor to a temperature determined by the speed of said fluid current and then to permit said resistor to cool to the ambient temperature of said fluid, and means for continually recording the value of said resistance, whereby alternate indications are obtained of resistance changes caused by said fluid current during the heating period of said resistor and the resistance of said resistor under ambient temperature conditions, from which the speed of said current can be determined.

3. A device as set forth in claim 2, wherein said periodic means includes means for controlling the duration of said intervals such that the periods of heating are greater than the periods of cooling.

4. The method of indicating the speed of fluid currents comprising subjecting a thermally responsive resistor to said currents, alternately heating said resistor and permitting it to cool, and continually translating the changes in the resistance of said resistor, as a function of changes in temperature, into a measurable quantity whereby alternate values are obtained of the ambient temperature of said fluid and the temperature of said resistor during heated condition under the cooling effects of said currents.

5. The method according to claim 4, wherein the periods of heating are greater than the periods of cooling.

6. The device of claim 2, further including a reference resistor, and means for alternately coupling said reference resistor to said recording means, for providing a base from which said resistance changes may be measured.

7. A fluid current measuring device comprising a resistor, the resistance of which varies with temperature, said resistor being exposed to said fluid current, periodic means to alternately apply and remove heating energy to said resistor, the intervals of application and removal of said heating energy being long enough to alternately heat said resistor to a temperature determined by the speed of said fluid current and then to permit said resistor to cool to the ambient temperature of said fluid, and means for coupling a recorder to said resistor to measure the variations in resistance of said resistor.

8. The device of claim 7, wherein said periodic means includes means for controlling the duration of said intervals such that the periods of heating are greater than the periods of cooling.

9. The device of claim 7, further including a reference resistor connected to said coupling means.

LEON HILLMAN.

REFERENCES CITED

The following references are of record in the file of this patent:

UNITED STATES PATENTS

| Number | Name | Date |
| --- | --- | --- |
| 1,265,775 | Hadaway | May 14, 1918 |
| 1,902,427 | Sawyer | Mar. 21, 1933 |
| 1,987,617 | Graham et al. | Jan. 15, 1935 |
| 1,999,378 | Tolson | Apr. 30, 1935 |
| 2,136,991 | De Blois | Nov. 15, 1938 |
| 2,197,564 | Yaglou | Apr. 16, 1940 |
| 2,210,903 | Dunmore | Aug. 13, 1940 |
| 2,287,786 | Diamond et al. | June 30, 1942 |
| 2,377,884 | Hillman | June 12, 1945 |